July 11, 1933.  A. E. LARSEN  1,917,530
AIRCRAFT OF THE ROTATIVE BLADE TYPE
Filed April 7, 1931    6 Sheets-Sheet 4

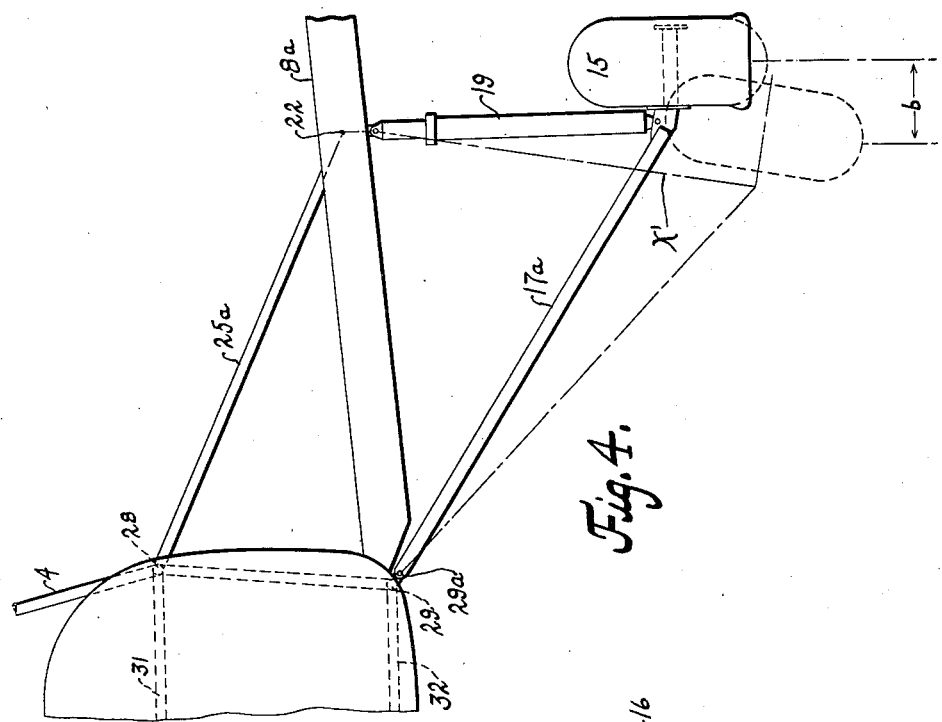
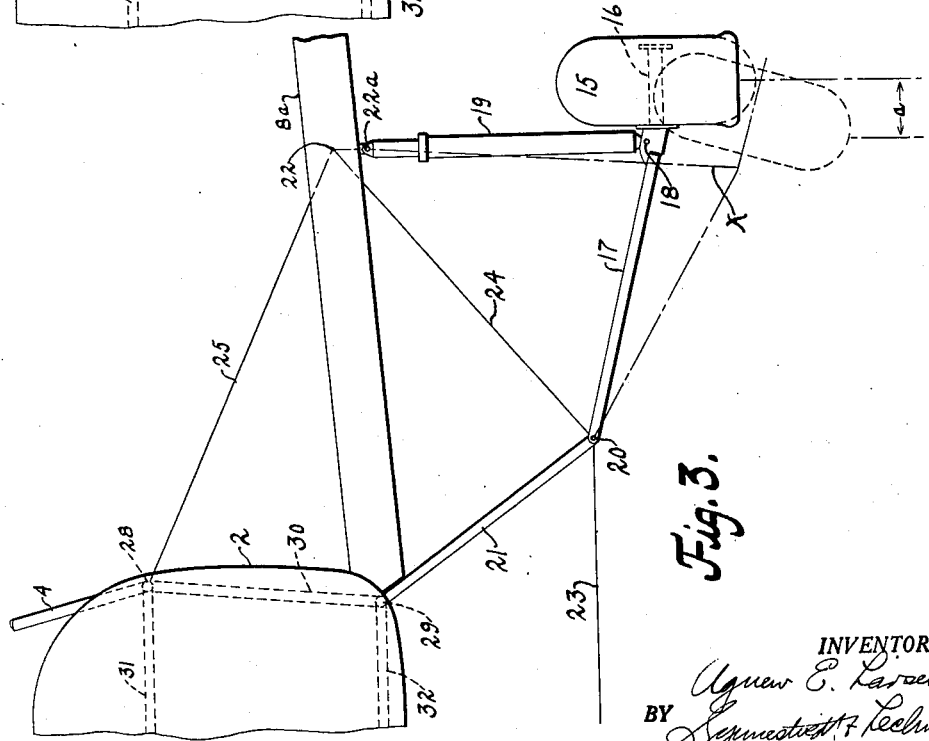

INVENTOR.
Agnew E. Larsen
BY
ATTORNEYS.

July 11, 1933.  A. E. LARSEN  1,917,530
AIRCRAFT OF THE ROTATIVE BLADE TYPE
Filed April 7, 1931   6 Sheets-Sheet 5

INVENTOR.
Agnew E. Larsen
BY
ATTORNEYS.

July 11, 1933.   A. E. LARSEN   1,917,530
AIRCRAFT OF THE ROTATIVE BLADE TYPE
Filed April 7, 1931   6 Sheets-Sheet 6

INVENTOR.
BY Agnew E. Larsen
ATTORNEYS.

Patented July 11, 1933

1,917,530

UNITED STATES PATENT OFFICE

AGNEW E. LARSEN, OF HUNTINGDON VALLEY, PENNSYLVANIA, ASSIGNOR TO AUTOGIRC COMPANY OF AMERICA, OF PHILADELPHIA, PENNSYLVANIA, A CORPORATION OF DELAWARE

AIRCRAFT OF THE ROTATIVE-BLADE TYPE

Application filed April 7, 1931. Serial No. 528,280.

This invention relates to aircraft of the rotative-blade type, and is particularly applicable to aircraft in which the sustaining means primarily comprises a set of rotative blades or wings constructed and arranged for rotative and swinging movements under the action of relative air-flow, since craft of this character are adapted for vertical descent and since the present invention involves primarily adequate provision for take-off and landing of such craft.

More particularly, the present invention relates to alighting mechanism, particularly adapted for use with craft of the character specified, which alighting mechanism or landing gear I contemplate constructing and arranging in such manner as to provide: a wide and stable landing base; very considerable vertical play or travel; ability to withstand shocks, both vertical and lateral; good ground clearance of the parts; and very low parasite drag or resistance to forward motion.

Other objects of the invention involve the co-ordination of the landing mechanism, fuselage, rotative blade mounting structure, and fixed wing elements (if they be employed), in a special cooperative relation, so that the parts serve to interbrace one another in a novel manner; whereby greater strength is attained, with reduction in the number and weight of parts and in the air resistance of the craft as a whole. The last of the objects just above mentioned is of particular advantage in an aircraft of the character hereinbefore referred to, in view of the fact that it is desirable to compensate for the wind resistance of the rotor hub and supporting pylon by reducing resistance of other parts of the machine.

A further important object of the invention is to materially reduce the spreading or lateral movement of the wheels accompanying the vertical motion permitted by the shock absorbers, which lateral movement is especially great in the ordinary V or split type of undercarriage. By my construction I am enabled to obtain a greater vertical travel in the landing gear, with a reduced side motion, or spreading, of the wheels, as compared with present known practice which is of very great advantage in connec tion with the type of aircraft here under dis cussion; for, in making steep or vertical land ings, the forward motion or roll of the ship as it touches the ground may be very little or nil, with the result that in ordinary type of landing gear the tires are apt to be rollec off the wheels, or the landing gear severely damaged. The present construction is als of great importance when landing steeply with a considerable side drift, the width o the tread in large measure counteracting an tendency of the craft to tip over under sucl circumstances.

Still another advantage of the more nearly vertical movement of this particular forr of undercarriage is the fact that the com pression members work, at all points of th travel, at the most efficient angle, or nearl so.

Among the more specific objects of the in vention are: to provide for easy assemblag inspection and repair of various parts of th aircraft, and especially of the undercarriag and bracing members; to simplify the linin up of parts, during assemblage; to retain ac justability of various parts of the landin mechanism while reducing parasite drag c the adjusting elements; to simplify attacl ment of the mechanism to the aircraft, an particularly by reduction in the number c fittings; and to house as many unstreamline parts as possible within streamlined parts c the craft or of the landing gear.

How the foregoing, together with suc other objects and advantages as are incider to the invention or will appear to those skille in the art, are attained, will be evident fro the following description, taken togeth with the accompanying drawings, in whic drawings—

Fig. 3 is a fragmentary, somewhat di grammatic, front elevational view of a cra similar to that shown in Figs. 1 and 2, b with certain modifications as to the fixed wing and bracing mechanism;

Fig. 4 is a view similar to Fig. 3 and illustrating, for purposes of comparison, a split-type landing mechanism applied thereto after the manner of prior practice;

Figure 1:
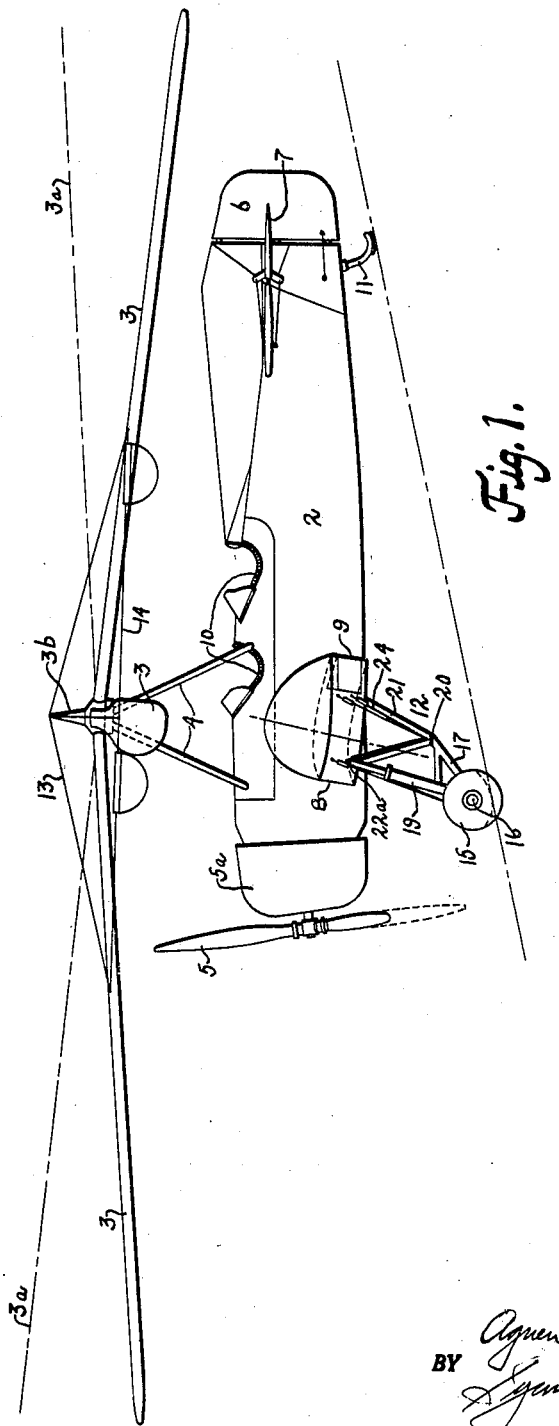
Fig. 1 is a side elevational view of an ai craft with rotative blades or wings, embod ing the present invention.
Figure 2:
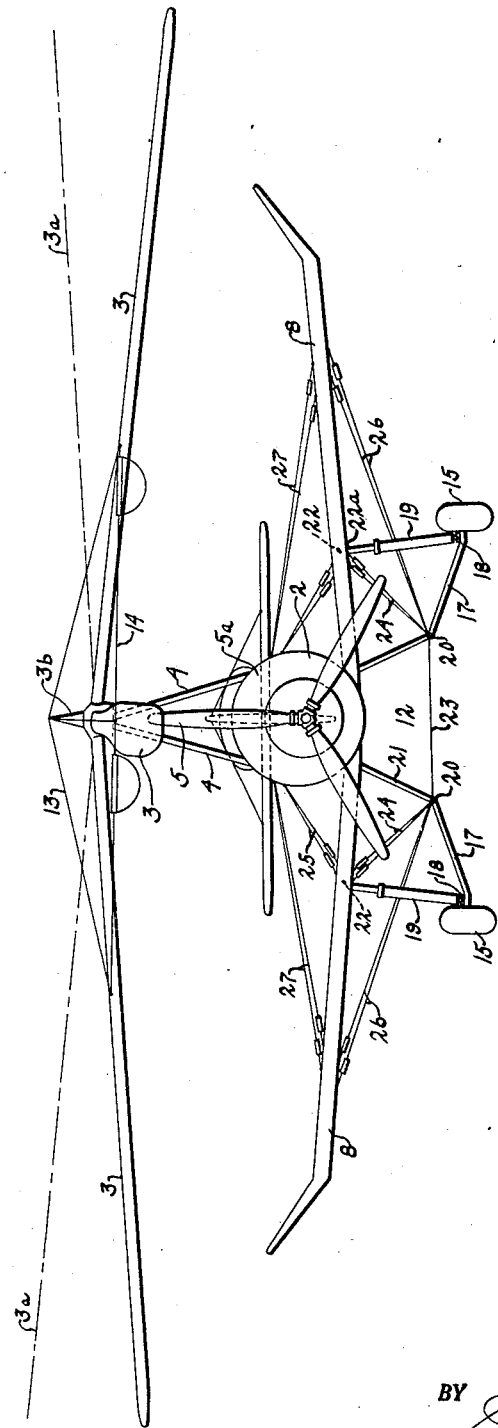
Fig. 2 is a front elevational view of t same.

As seen in Figs. 1 and 2, I have illustrated an aircraft of the rotative blade type, having a body or fuselage 2, rotative blades 3, mounted thereon by means of the pylon or pyramid 4, propeller and power plant indicated at 5, 5a, rudder and elevator indicated at 6, 7, fixed wings and ailerons at 8, 9, cockpits at 10, tail skid at 11, and landing gear indicated generally by the numeral 12. As indicated at 3a the blades or wings 3 have swinging movement with respect to their rotatively-mounted hub or axis member 3b under the action of centrifugal, lift and other forces in flight. I have also shown droop supports 13 and yielding blade-interconnections 14, used to support and to interposition the blades when at rest, it being understood that the blades are normally displaceable in, and with respect to, their path of travel during flight as more fully disclosed, for example, in the pending application of Juan de la Cierva, Serial No. 414,901, filed December 18, 1929.

In general, the landing gear 12, as seen in Figs. 1 and 2, includes a pair of widely spaced apart wheels 15 (which may be of the air cushion type), each mounted on a spindle member 16 secured at the outer end of compression means 17, such compression means being pivoted at 18 to the lower end of a suitable shock absorber device such as the hydraulic cushion 19, the members 17 further being pivoted at 20 to the rigid compression struts 21, which latter are adjacent the junction point of the fuselage 2 and the fixed wings 8. The shock absorbers 19 extend nearly vertically, or approximately at right angles to the fixed wings 8, being at their upper ends pivotally secured to the latter at the point 22a.

Tension means 23 interconnect the compression members beneath the fuselage, as shown in Fig. 2, and such means 23 may comprise a plurality of cables or streamlined tie rods. Other tension means 24 extend from the points of attachment of tension means 23, upwardly and outwardly to the fixed wings 8 adjacent the points of attachment of the shock absorbers 19. From thence, additional tension means 25 extend upwardly and inwardly to the fuselage 2, preferably being attached to the same longerons of the fuselage frame to which the pylon legs 4 are attached. In the construction of Figs. 1 and 2, the fixed wings 8 are still further braced by external tension means 26 and 27, the former extending from points spaced outwardly on said fixed wings to points adjacent the juncture of parts 17, 21, 23 and 24, and the latter extending from points spaced outwardly on wings 8 and extending in to the fuselage, for attachment to the longerons to which members 25 and 4 are attached.

A similar system is employed in the construction shown in Fig. 3, the difference in the latter construction over the former being that the fixed wings 8a are of the semi-cantilever type, the bracing wires 26, 27 being omitted in this construction. The figure shows, in dotted lines, an upper fuselage longeron 28, a lower fuselage longeron 29, a vertical brace 30, and upper and lower transverse members 31 and 32. The upper pivot 22a of the shock absorber 19 is also shown, the point 22 illustrating how the tension and compression forces are brought together at a point in the fixed wing.

Instead of the customary short travel of approximately six inches in the landing gear as used on a normal airplane having a weight comparable to the machine herein described, I contemplate a much greater travel, in order to provide for vertical landings, for example, twelve inches or more of travel; and I have found that such travel will adequately cushion vertical landings of aircraft of this type, even when landing without any head wind. My construction, as shown in Fig. 3, as compared with a construction such as shown in Fig. 4, in each of which fourteen inches of normal travel, for example, is provided, (with two inches additional, for excessive thrusts), causes a side movement of the wheel, indicated at a, of approximately seven and one-half inches, whereas the construction in Fig. 4 produces a side movement indicated at b of approximately ten and one-half inches, the latter being, therefore, about 40% greater. Furthermore, the line x, indicating the maximum deflection of position of the shock absorber 19 in Fig. 3 is only about four and one-half degrees off normal, whereas in Fig. 4 the line $x'$ is about ten degrees off normal, which is more than 100% greater angle. In addition, in the construction shown in Fig. 4, side thrusts, due to landing with lateral drift, must be carried through element 17a at a greater variation of angle up to the point 29a than is the case with side thrusts carried through my element 17 to its pivot point 20, and beyond.

By carrying the pivot point 20 down, as I have done, and utilizing tension means 23, 24, 25, I am enabled to materially lighten the compression members 17, 21 as compared with the otherwise necessary compression member 17a, and to eliminate entirely compression members such as shown at 25a in Fig. 4. The result of this is not only a substantial reduction in weight, but also a reduction in parasite drag, since the total head resistance of parts 17, 21, 23, 24 and 25, I have found to be very materially less than the resistance of the parts 17a and 25a when constructed to care for equivalent loads.

Turning now to the details of the construction, as illustrated in Figs. 5 to 11 inclusive, it will be seen that compression members 21 are each formed as a N strut, of streamline tubing, with a relatively heavy forward leg 21a, and lighter legs 21b and 21c. Similarly, element 17 is formed as a V strut, of streamline tubing, having a forward leg 17b, a rear leg 17c and an upper cross brace 17d.

The tension means 23 is preferably composed of a pair of streamline tie rods, a heavy forward rod 23a and a lighter rear rod 23b. Similarly, tension means 24 preferably comprises a heavier tie rod 24a, and lighter, rear tie rods 24b and 24c. Likewise, the uppermost tension means 25 may be divided into a pair of tie rods 25b and 25c, as seen fragmentarily in Fig. 5, which is a fragmentary perspective view showing fully only the parts beneath the wing 8a.

In general, the parts are connected as follows: The forward main beam 8b of the wing 8a (said beam 8b being fragmentarily shown in Fig. 10) is at its inner end attached to the lower fuselage longeron 29 at the point of juncture of the parts 21a, 21b, 30 and 32. A second junction point is at the neutral axis of this cantilever beam, at point 22 of Fig. 3, at which are connected shock absorber 19 and wires 24a, 24b and 25b. The rear main beam of wing 8a (not shown) joins lower fuselage longeron 29 at a third point, where the part 21c and another set of fuselage braces 30 and 32 meet. At the neutral axis of the latter beam, and directly behind the point 22 are connected the wires 24c and 25c, as by ordinary fork-ends. A fifth junction point is formed by the parts 17b, 17d, 21a, 23a and 24a; a sixth junction point by the parts 17c, 17d, 21b, 21c, 23b, 24b and 24c; and a seventh junction point is formed by the parts 17b, 17c, 16 and 19.

The specific construction of the parts at the main junction points will now be set forth, as they are of importance in obtaining the advantages of the invention to the fullest extent.

Figure 5:
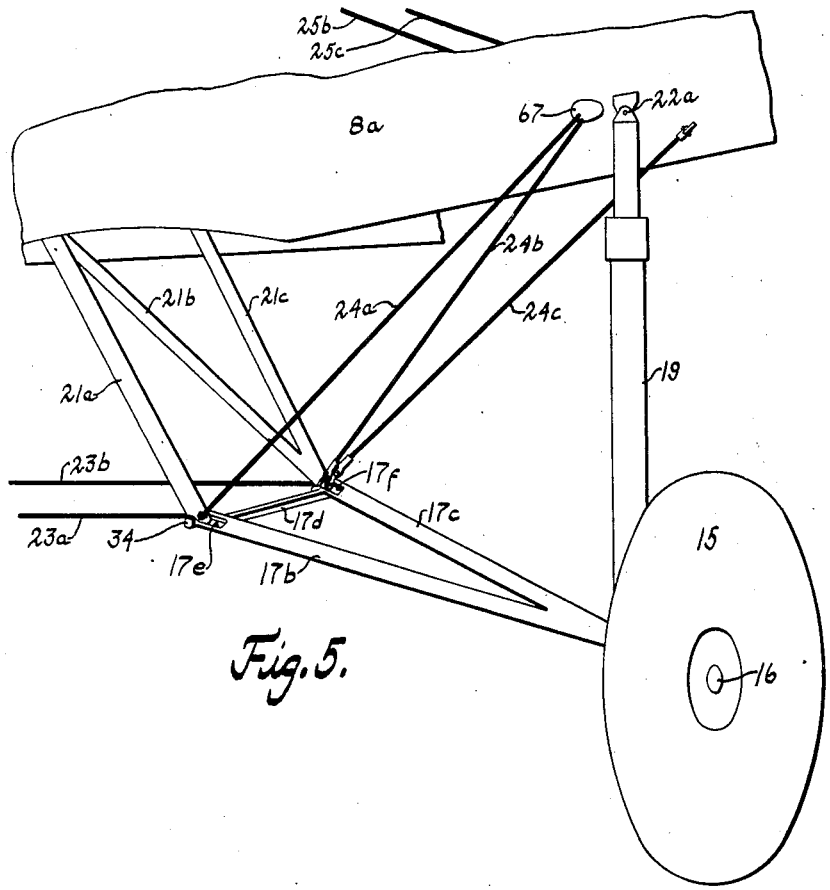
Fig. 5 is a somewhat enlarged, perspective view of the construction shown in Fig. 3, clearly illustrating the N strut, V strut, compression shock absorbers, and tension bracing members employed.
Figure 6:
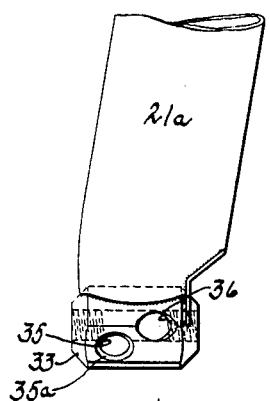
Figs. 6 and 7 are still further enlarged detailed views of the lower ends of the N strut.
Figure 7:
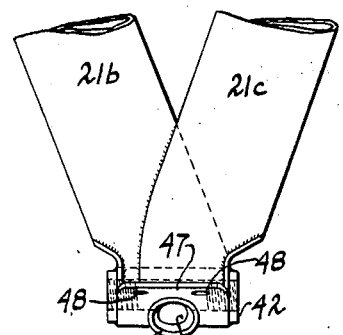
Figure 8:
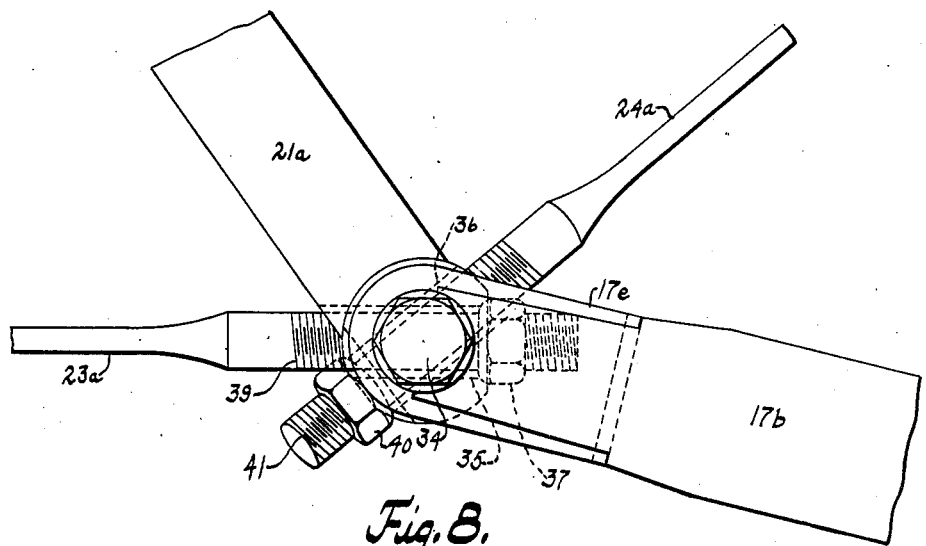
Fig. 8 is a fragmentary enlarged, front elevational view of the juncture made by the lower part of the front leg of the N strut, the cooperating part of the V strut, and the associated tension members.

The upper ends of the V legs 17b and 17c are forked, as at 17e and 17f in Fig. 5, said forks being interbraced by the element 17d. Between the forks 17e is fitted the pivot or trunnion element 33 (Fig. 6) which may be formed integral with or welded to the foot of strut leg 21a. The part 33 is drilled longitudinally, and tapped at each end, to receive screws 34 (seen in Figs. 5 and 8), which are inserted through the respective forks 17e, thus pivoting the parts together, and these screws 34 are then preferably wired as against unscrewing. Pivot member 33 is further drilled, transversely, with a horizontally disposed hole 35 and an obliquely disposed hole 36. At the outer end of hole 35 is formed a ball seat 35a, which cooperates with the ball face of nut 37 (see Fig. 8), said nut being threaded onto the enlarged end 39 of rod 23a, said end 39 having a loose fit in the hole or bore 35. The hole or bore 36 has a similar ball seat at its inner, lower end to accommodate the ball face of the nut 40, threaded onto the enlarged threaded end 41 of the tie rod 24a. The forks 17e, as seen in Fig. 8, thus serve to house a considerable number of parts, including the lower end of strut leg 21a, a large portion of the rod heads 39 and 41, the pivot member 33 and the ball nut 37.

In assembling the construction, it will be seen that any slight inaccuracies of alignment will be taken care of by the clearances of the bores with respect to the heads 39 and 41, and that firm seating and securing of the rods and other parts will always be obtained, by means of the ball nuts and ball seats; and in addition, that adjustment and take-up are very easily provided for, while yet retaining a minimum of head resistance or parasite drag for the whole joint.

Figure 9:
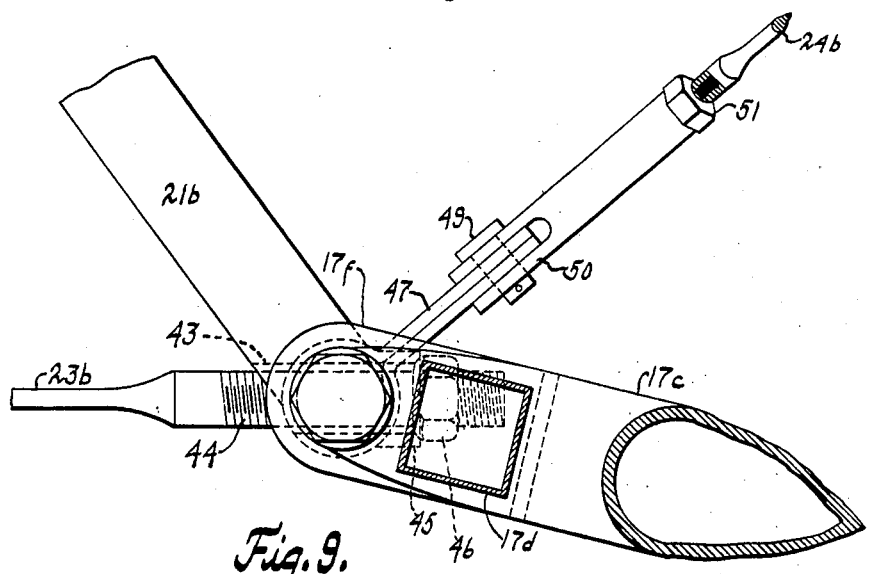
Fig. 9 is a similar view of the members at the rear junction point, showing in section part of the V strut and a bracing member thereof.
Figure 11:
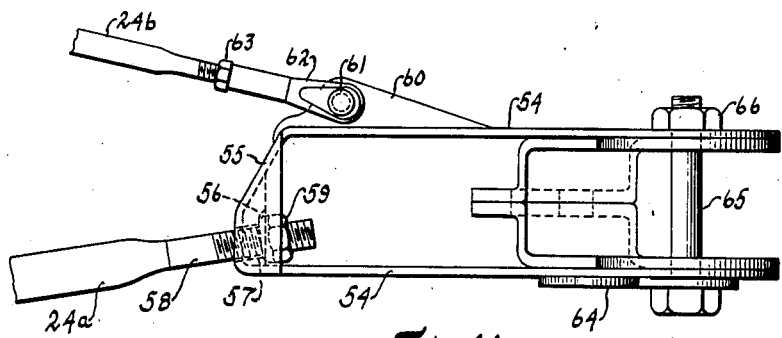
Fig. 11 is a view of the structure shown in Fig. 10, in the direction of the arrow 11, and with the wing beam omitted.
Figure 10:
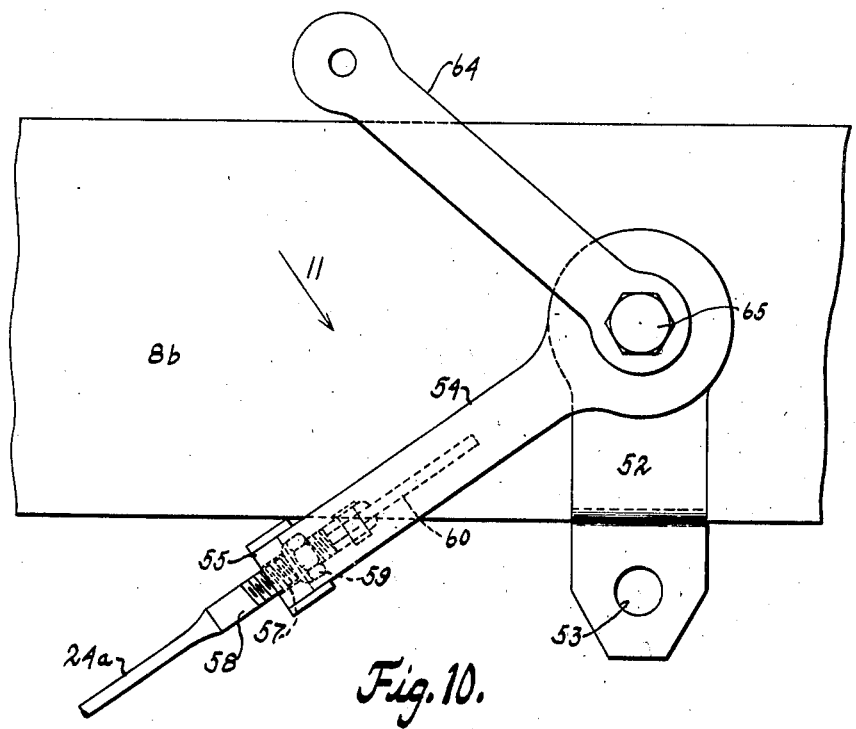
Fig. 10 is an enlarged front elevational view showing the attachment for tension members and shock absorbers to the front main beam of one of the fixed wings of the machine.

The rear joint is similarly arranged, the pivot member 42 fitting between the forks 17f, and being drilled longitudinally for pivot pins, and drilled transversely, as at 43, to receive the head or end 44 of rod 23b (see Fig. 9), an extended ball seat 45 being provided, to receive the ball nut 46. Since two other wires, 24b and 24c must be attached to trunnion 42, the latter trunnion is provided with an ear 47, having a pair of holes 48, through which the pins 49 of rod forks 50 extend. Since the rods 24b and 24c are lighter than rod 24a, and, furthermore, lie directly behind the latter, they may be provided with such fork ends 50 and adjusting means 51, without adding materially to the head resistance. This joint, as a whole, as seen in Fig. 9, also presents a neat appearance, with very little parasite drag, comparing favorably with the forward joint construction shown in Fig. 8.

As before indicated, the forward members of the landing gear, namely, the parts 19, 17b, 21a, 23a, and 24a are the heavier parts, for, as seen in Fig. 1, they carry the major thrusts and other loads to or through the forward main wing beam 8b. For this reason, among others, I have devised a special form of juncture for the parts 25b, 24a, 24b and 19 upon the main wing beam 8b, and the latter construction will be clear from an inspection of Figs. 10 and 11.

A pair of ears 52, preferably flat against, or else countersunk in, the beam 8b, extend out through the wing covering, at the bottom of the beam, and have apertures 53 for insertion of the pivot 22a of the shock absorber 19. Flat against the ear 52 on either side of the beam lies a leg 54 of a U member 55, the bottom of the U preferably being formed with a solid seat member 56, having a hole 57 drilled therein, through which the threaded head 58 of tie wire or rod 24a extends with freedom for angular movement, said head being secured in place by means of the ball nut 59. On the rearward leg 54 is a web 60, apertured to receive pin 61, securing the forked end 62 of the threaded tie rod or wire 24b, length adjustment of the latter being attained by rotating it, and locking being effected by the device 63. A suitable device for the attachment of upper tension wire 25b may be provided, such as the ear 64 extending upwardly through the wing covering. I may, however, substitute for the member 64, a U-structure somewhat similar to the U-structure 54, 55, with ball-nut adjustment, if desired.

All of these parts are secured together, approximately at the neutral axis of the cantilever wing beam 8b, by means of the through bolt 65, fastened by nut 66. A simple streamline hood or shield 67 (Fig. 5) may also be provided.

It will now be seen that with the construction of the present invention, practically all of the forces and strains of tension and compression, carried to or through the fixed wings 8a, are carried at the proper angles with respect to the point 22 (Fig. 3).

Direct vertical landing loads result primarily in imposing compressive forces on absorbers 19, struts 21 and wing beams 8b, and tension stresses on the tie-rod systems 23, 24, 24; the tie-rod or tension systems taking a considerable part of the strains set up, without carrying all the load through the fuselage, as results with a construction such as shown in Fig. 4, for example. An unusual landing load on a particular wheel, however, may be taken primarily by the compression members on that side of the landing gear and the tension members on the other side; while excessive landing load on the opposite wheel is taken primarily by the compression members on its side and the tension members on the opposite side. The foregoing is, of course, only a general statement, since (from Fig. 3), it is apparent that a direct vertical landing load on the left wheel of the aircraft, for example, will impose tension stresses on the members 24 on the left side as well as on the right side of the craft, but it will not impose stresses on the members 25 on the left side of the craft; and vice versa. Also, it will be understood that the distribution of stresses will be different according as the side thrust differs; a landing with side drift or with a side thrust producing reactions different from a straight vertical landing, and a landing with forward roll producing reactions somewhat different from a landing without forward roll. In any event, however, strains and stresses on the pylon legs, the fuselage, the fixed wings, the landing gear, and the bracing elements will be distributed through one or more of the various members in a very advantageous manner.

It will furthermore be apparent that the compression members, together with the complete system of tension means considered as a whole (one-half of which is shown in Fig. 3, in diagrammatic front elevation) comprising the sets of wires, 25, 24, 23, 24 and 25, provides in general a pair of truss-like structures interconnected by tension means to form a system which assumes, in whole or in part, wing lift-loads, wing landing loads, undercarriage weight-loads, undercarriage thrust-loads in landing, side thrust stresses in landing, etc., while also distributing lift or downward loads of the rotor and its pylon. The fixed wings themselves, or rather their beams, thus become main compression members of the landing gear, and compression members external to said wings are reduced to a minimum. Good ground clearance and low frontal area of the gear also results. As is evident, the proportioning of the N and V frames of the construction, and the travel of the shock absorbers, is such that each pair of frames forms a relatively flat angle when the absorber is extended and assists in taking side thrusts, but as the absorber is compressed the angle between the frames becomes sharper, and the later stages of shock absorber travel are nearly vertical, producing advantages heretofore pointed out in the comparison of Figs. 3 and 4.

What I claim is:—

1. In an aircraft alighting construction of the character described, a pair of N-strut-frames extending downwardly from the body of the craft, a pair of V-strut-frames each pivoted at the lower end of an N-strut-frame and extending outwardly therefrom, tie-rod means interconnecting the framing and connected thereto adjacent the pivots, alighting devices mounted at the outer ends of the V-strut-frames, and substantially vertically-acting shock absorbers for the latter.

2. In an aircraft alighting construction of the character described, a pair of N-strut-frames extending downwardly from the body of the craft, a pair of V-strut-frames each pivoted at the lower end of an N-strut-frame and extending outwardly therefrom substantially beyond the body of the craft, tie-rod means interconnecting the framing and connected thereto adjacent the pivots, alighting devices mounted at the outer end of the V-strut-frames, and substantially vertically-acting shock absorbers for the latter, together with compression members to which said absorbers are connected extending laterally from the body of the craft over said N-strut-frames.

3. In an aircraft landing gear, adjoining compression members for connecting the landing means proper to the craft, a pivotal connection between the members, tie means for bracing one of said members, and means for securing the tie means adjacent the pivotal connection, said pivotal connection including a trunnion-like member bored longitudinally to receive a pivot pin and bored transversely to receive said securing means, the transverse bore being of greater diameter than the entering end of the tie means.

4. In an aircraft landing gear, adjoining compression members for connecting the landing means proper to the craft, a pivotal connection between the members, tie means for bracing one of said members, and means for securing the tie means adjacent the pivotal connection, said pivotal connection including a trunnion-like member bored longitudinally to receive a pivot pin and bored transversely to receive said securing means, the transverse bore being of greater diameter than the entering end of the tie means, together with a rounded seat at an end of the transverse bore, and a rounded adjusting nut co-operating with said seat.

5. In an aircraft landing gear, a laterally-extending compression member, downwardly-extending compression means, upper and lower diagonally-extending tension means, fittings for attaching all of said means to said member, and a through-bolt securing the parts to said member at the neutral axis of the latter, said fittings including means of angular and longitudinal adjustment of said tension means.

6. In an alighting mechanism for an aircraft, a pair of wheels relatively widely spaced from each other and also from the body of the craft at opposite sides thereof, compression elements extended laterally from the body of the craft above said wheels, generally upright compressible shock absorption means interposed between the wheels and said elements, and, for each wheel, compression means extended therefrom generally inwardly and upwardly to the body of the craft, the compression means last mentioned including a pair of substantially flat frame structures pivoted to each other in a generally edgewise relation, the foregoing parts all being constructed and relatively proportioned in such manner that when the shock absorption means is extended, as, for example, when the craft is in flight, the two frame structures of each compression means lie in planes extended at a relatively flat angle with respect to each other, whereby efficiently to transmit at least certain lateral landing thrusts to the fuselage.

7. In an aircraft, a primary means of sustension comprising a system of freely rotative sustaining blades or wings arranged for normal actuation by relative air flow, in which construction substantially vertical descent to a landing may be effected with substantially no ground speed, landing mechanism for the craft including a pair of wheel elements relatively widely spaced from each other and also from the body of the craft at each side thereof, supporting members for said wheel elements including relatively long generally laterally extended supporting members, means for supporting the wheels at the outer ends of said members, a structure providing a fixed pivot point for the other ends of said members spaced well below the body of the craft, compression elements extended at opposite sides of the body of the craft above said wheel elements, and a relatively long-travel shock absorption means for each wheel element extended between one of said laterally extended elements and the wheel supporting member at that side of the craft, whereby, even when making a vertical descent to a landing with substantially no ground speed, the wide base of support provided by the widely spaced wheels serves to prevent lateral tipping of the craft, and the relatively long and laterally extended wheel supporting members provide relatively great vertical wheel travel and thus materially extended shock absorption to cushion even vertical descent with minimum lateral wheel travel or rolling.

8. In an aircraft having, as its primary means of sustension, a system of rotative blades or wings mounted above the body of the craft, in which construction the sustaining wings provide for substantially vertical descent and landing without material roll on the ground, an alighting mechanism including, in combination with compression members extended laterally at opposite sides of the body of the craft, compression means extended downwardly from the body of the craft with pivot means associated therewith at a point below said body having a pivot axis extended generally longitudinally or fore and aft of the said body, a V-frame having pivot means associated with the legs thereof to cooperate with the pivot means first mentioned, tension bracing means interconnecting a lower portion of said compression means and said compression members at points spaced from the body of the craft whereby to brace and substantially fix the position of said pivot means, a landing wheel mounted on said V-frame adjacent the apex thereof, and telescopic shock absorption means connected with said V-frame adjacent its apex and also with one of said compression members at a point adjacent to the point of attachment of the tension bracing means thereto.

In testimony whereof I have hereunto signed my name.

AGNEW E. LARSEN.